H. R. STAFFORD.
LOCOMOTIVE.
APPLICATION FILED MAR. 29, 1909.

934,944.

Patented Sept. 21, 1909.
4 SHEETS—SHEET 2.

WITNESSES
James C. Herron
S. R. Bell

INVENTOR
Hal R. Stafford
by Snowden Bell
Att'y.

H. R. STAFFORD.
LOCOMOTIVE.
APPLICATION FILED MAR. 29, 1909.

934,944.

Patented Sept. 21, 1909.
4 SHEETS—SHEET 3.

H. R. STAFFORD.
LOCOMOTIVE.
APPLICATION FILED MAR. 29, 1909.
934,944.
Patented Sept. 21, 1909.
4 SHEETS—SHEET 4.
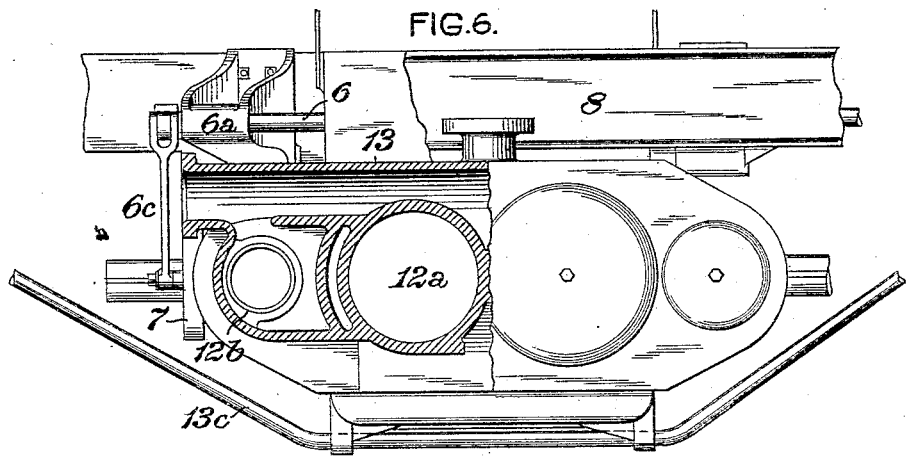
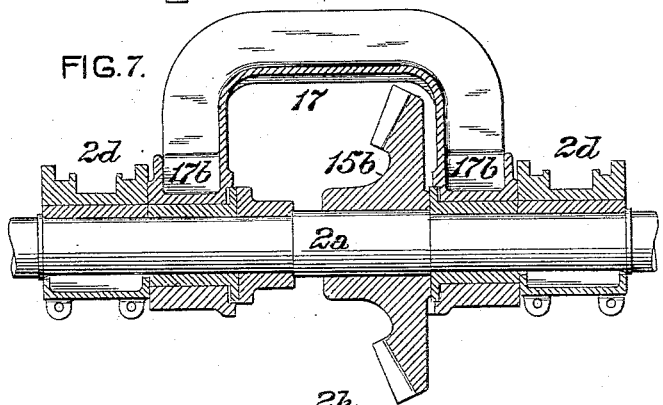
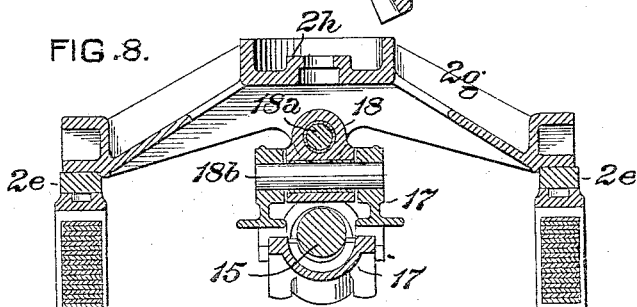
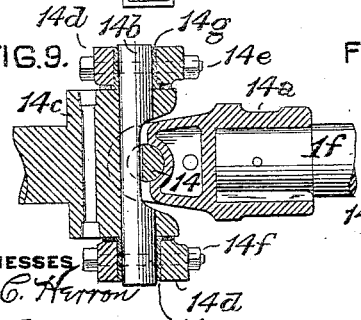
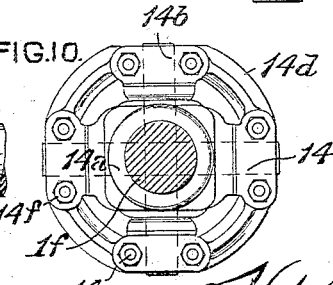
WITNESSES
INVENTOR
Att'y.

UNITED STATES PATENT OFFICE.

HAL R. STAFFORD, OF SCHENECTADY, NEW YORK, ASSIGNOR TO AMERICAN LOCOMOTIVE COMPANY, OF NEW YORK, N. Y., A CORPORATION OF NEW YORK.

LOCOMOTIVE.

934,944.     Specification of Letters Patent.    Patented Sept. 21, 1909.

Application filed March 29, 1909. Serial No. 486,310.

*To all whom it may concern:*

Be it known that I, HAL R. STAFFORD, of Schenectady, in the county of Schenectady and State of New York, have invented a certain new and useful Improvement in Locomotives, of which improvement the following is a specification.

My invention relates to locomotives of the general class or type, in which, for the purposes of affording the maximum tractive force obtainable and of enabling the locomotive to readily traverse curves of comparatively short radius, the entire weight is utilized for adhesion, all the wheels being driving wheels, and the locomotive is supported upon swiveling trucks, to the wheels of which rotation is imparted through the intermediation of gearing.

The object of my invention is to simplify and economize the construction and cost of maintenance of a locomotive of the type above indicated, by the provision of novel and improved means for the application of power to a main or primary driving shaft and its transmission to the several driving axles; for the transmission of all strains of the driving mechanism directly to the engine frames and effecting substantial transverse bracing of the latter; and for supporting the driving gear shafts upon the trucks in such manner as to relieve the axle journal bearings from end thrust of the driving gear and permit free movement of the axles relatively to the gear shafts without impairment of the normal relation of the driving and driven gears.

The improvement claimed is hereinafter fully set forth.

Figure 1:
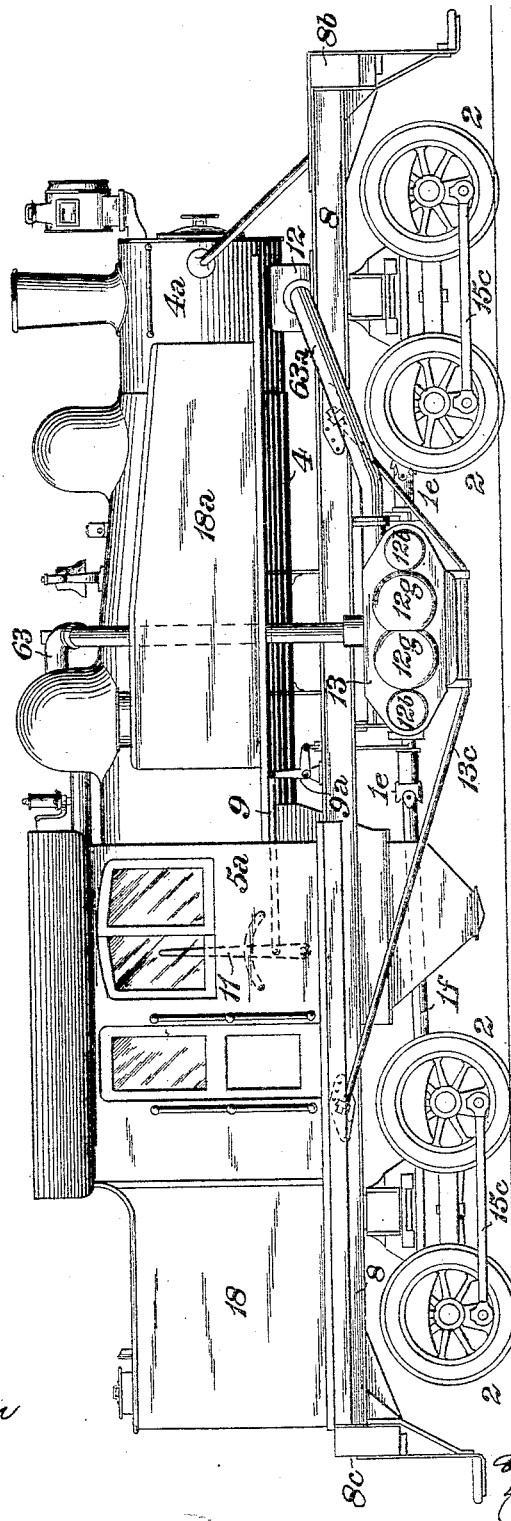
Figure 2:
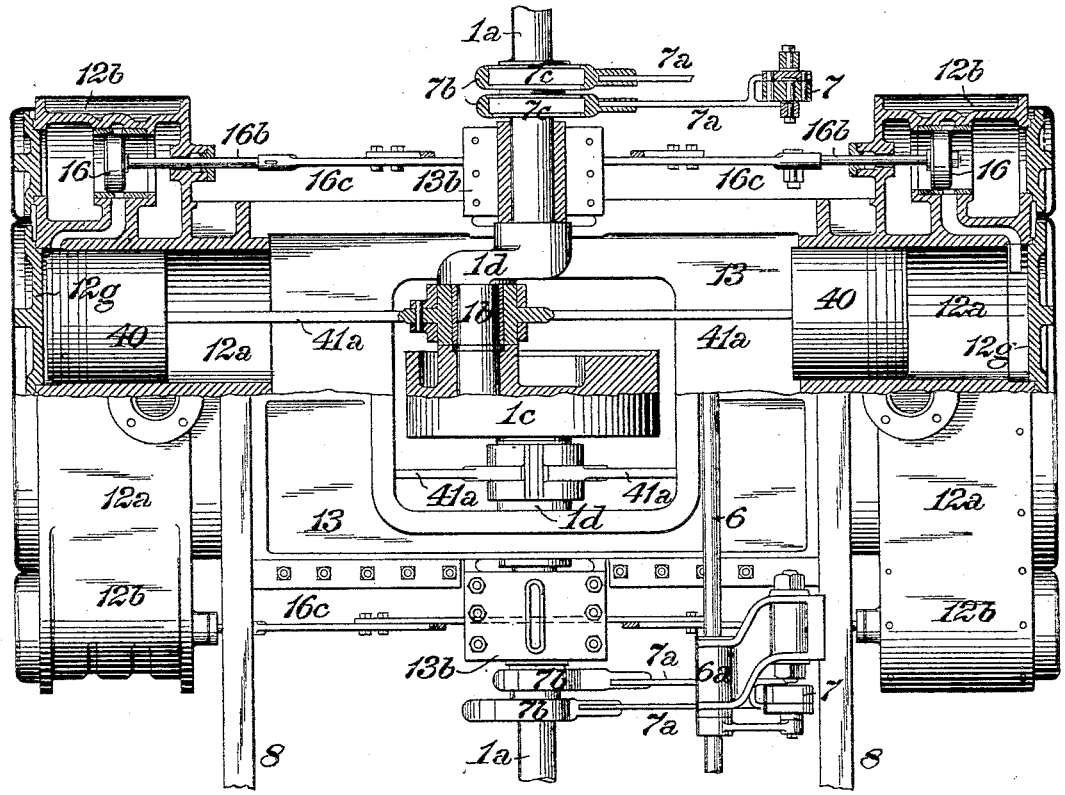
Figure 3:
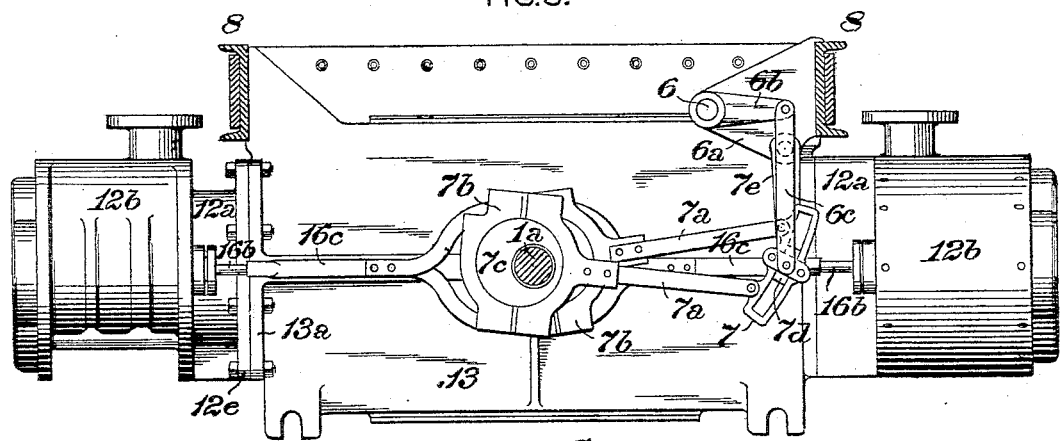
Figure 3A:
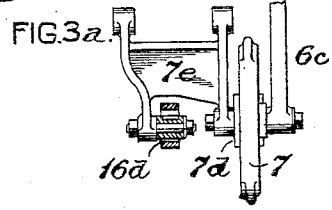
Figure 4:
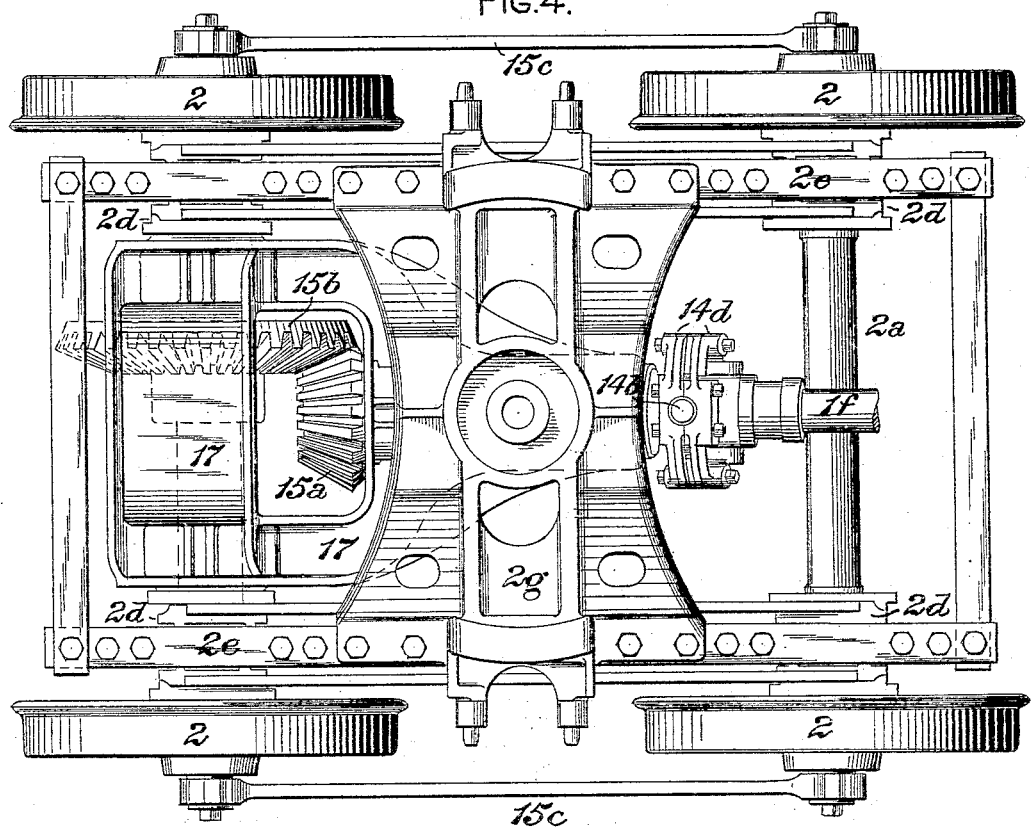
Figure 5:
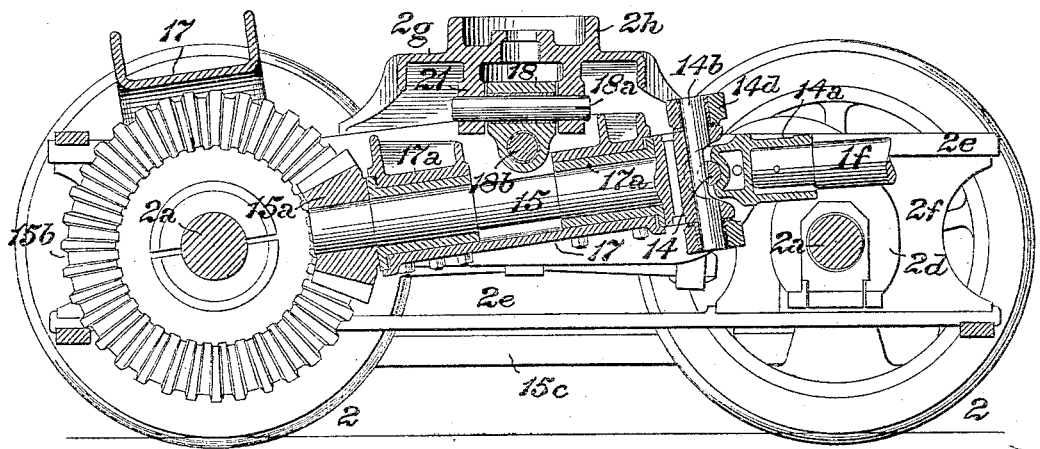

In the accompanying drawings; Figure 1 is a side view, in elevation, of a locomotive embodying my invention; Fig. 2, a plan view, partly in elevation and partly in section, of the cylinders, valve gear, and cylinder frame; Fig. 3, a vertical transverse section through the main supporting frame and cylinder frame, showing a pair of cylinders and their valve gear in elevation; Fig. 3$^a$, a view, in elevation, of a valve rocker and the adjacent shifting link; Fig. 4, a plan or top view of one of the trucks; Fig. 5, a vertical longitudinal central section through the same; Fig. 6, a view, partly in side elevation and partly in transverse section, of the cylinder frame and the cylinders on one side thereof; Fig. 7, a transverse section through a gear frame, a driven gear, and the bearings of the truck axle on which said gear is secured; Fig. 8, a transverse central section through a truck frame and the knuckle joint suspending the gear frame thereon, and through the gear frame and gear shaft; Fig. 9, a longitudinal central section through a knuckle connecting a gear shaft and intermediate shaft; and Fig. 10, a view, in elevation, of the same, with the intermediate shaft in section.

In the practice of my invention, the boiler, 4, which is of the standard locomotive type, is mounted upon a main frame comprising a pair of side frame members, 8, which, in this instance, are shown as rolled metal channel sections, and front and rear buffer beams, 8$^b$, 8$^c$, connecting the side frame members. These are also connected by an interposed saddle or bed plate, 12, upon which the smoke box, 4$^a$, of the boiler, rests, and to which it is attached in the usual manner, and by a cylinder frame, 13, hereinafter described. A rear tank, 18, is carried upon the rear portions of the side frame members, and side tanks, 18$^a$, are located forward of the cab, 5$^a$, on the opposite sides of the boiler.

The locomotive is supported upon a front and a rear swiveling truck, which trucks are similar in construction and are pivotally connected to the main frame, one of them below the saddle, 12, and the other below the rear tank. The trucks are each carried upon four wheels, 2, which are fixed upon axles, 2$^a$, journaled in axle boxes, 2$^d$, which are fitted in the pedestals, 2$^f$, of the truck frames, 2$^e$. Rotation is imparted to one of the axles of each truck through gearing, as hereinafter described, and the two axles of each truck are coupled by connecting rods, 15$^c$, the ends of which are fitted upon crank pins on the wheels, all the wheels of the locomotive thus being driving wheels, and the entire weight being made available for adhesion, with the capability of traversing curves of comparatively short radius.

The locomotive is actuated by a multiple cylinder motor, comprising a plurality of single acting cylinders, 12$^a$, which are preferably, as shown, disposed in pairs, located oppositely, in planes transverse to the main frame members, 8, below the same and projecting outwardly therefrom. The cylinders, 12$^a$, are closed, at their outer ends, by removable heads, 12$^g$, and are provided, near their inner ends, with peripheral flanges, 12$^c$, which are securely bolted to corresponding flanges, 13$^a$, on the outer sides of a cylinder frame, 13, which is a box or casing, of substantially rectangular form in longitudinal and transverse section, and is interposed between, and bolted to, the side frame members, 8. It will be obvious that if preferred, a single cylinder may be located on one side of the cylinder frame and two cylinders on the opposite side, or more than two pairs of cylinders may be employed, and also that the motor may be of the compound type instead of single expansion as shown.

The cylinder frame forms a closed crank case, which, in addition to providing a support for the cylinders and the bearings of the main or primary driving shaft, and serving as a receptacle for lubricating material for the crank pins and connecting rod bearings, acts as a substantial transverse brace or strut for stiffening the main frame of the locomotive. The main frame is further braced, and the attachment of the cylinder frame thereto strengthened, by tension rods, 13$^e$, passing through lugs on the bottom of the cylinder frame and secured at their ends to the main frame. Openings, closed by removable caps or covers, are formed in the upper and lower and end walls of the cylinder frame, and it is provided with a suitable oil glass gage and overflow and drain cocks.

The cylinders, 12$^a$, are fitted with pistons, 40, and, in the specific construction of motor herein shown, the pistons of the opposite cylinders of each pair are coupled, by connecting rods, 41$^a$, to one of a pair of crank pins, 1$^b$, which are fixed at right angles one to the other, in a counterbalanced crank wheel, 1$^c$, and in correspondingly set cranks, 1$^d$, formed upon or secured to a main or primary driving shaft, 1$^a$, located in the longitudinal central plane of the locomotive, and journaled in bearings, 13$^b$, in the ends of the cylinder frame 13. Steam is supplied to the cylinders through steam pipes, 63, leading from the dome of the boiler, and is discharged therefrom through exhaust pipes, 63$^a$, leading to an exhaust nozzle in the smoke box.

The supply and exhaust of steam to and from the several cylinders are effected by distribution valves, 16, which are shown as of the piston type, and are fitted to reciprocate in valve chests, 12$^b$, at the sides of the cylinders. Steam is preferably admitted to the valve chests on the outer sides of the distribution valves, in order that the valve stem packing may be subjected only to exhaust steam pressure. The distribution valves of each pair of oppositely located cylinders are actuated by a single valve gear, which valve gears may be of any of the suitable known types, and are shown as shifting links, 7, coupled by eccentric rods, 7$^a$, to the straps, 7$^b$, of eccentrics, 7$^c$, fixed on the driving shaft, 1$^a$. The valve stems, 16$^b$, of the distribution valves of each pair of oppositely located cylinders, are coupled one to the other by a connecting bar, 16$^c$, having, in this instance, a central yoke to enable it to be reciprocated with proper clearance from the driving shaft and its bearings, the valve chests being located in the same horizontal plane as the cylinders. It will, however be obvious that, if preferred, the valve chests may be placed sufficiently far above the plane of the cylinders and crank shaft to enable the connecting bars to pass above the latter, in which case the yokes will be unnecessary and will not be used. Reciprocating movement is imparted by the links, 7, to the connecting bars and valve stems, through the intermediation of rockers, 7$^e$, journaled on pins fixed to the cylinder frame, and having two downwardly depending arms connected by a plate or web, one of said arms being coupled to the die, 7$^d$, of the adjacent link, and the other to a die, 16$^d$, fitting in a guide formed on the adjacent connecting bar. The links of both pairs of oppositely located cylinders are coincidently raised and lowered, to effect reversal of direction of rotation of the driving shaft and variation of the point of cut off, as from time to time required, by a reverse shaft, 6, journaled in bearings, 6$^a$, on the cylinder frame and carrying lifter arms, 6$^b$, coupled by link hangers, 6$^c$, to the shifting links, 7. The reverse shaft, is coupled, through a bell crank, 9$^a$, and reach rod, 9, to a reverse lever, 11, in the cab, so as to be swung in its bearings in the ordinary manner.

The main or primary driving shaft, 1$^a$, is coupled, at its ends, by universal joints, 1$^e$, of any suitable and preferred construction, to intermediate shafts, 1$^f$, which extend forwardly and rearwardly and terminate at each of the trucks, on the inner side of the axle thereof which is the nearer to the cylinder frame. The ends of the intermediate shafts within the trucks are coupled by universal joints or knuckles, hereinafter described, to gear shafts, 15, which are supported in bearings, 17$^a$, in gear frames, 17, coupled, by universal joints, to transoms, 2$^g$, connecting the upper side members of the truck frame, 2$^e$, and carrying the center bearings, 2$^h$, of the truck. The gear shafts, 15, carry, upon their opposite ends, bevel pinions, 15$^a$, which engage corresponding gears, 15$^b$, on the outer axles of the trucks, that is to say, those farther from the cylinders, and, as before stated, the two axles of each truck are coupled by connecting rods, 15$^c$. The gear frames, 17, are forked at and adjoining their outer ends, and their outer end transverse portions, which are made in U form, so as to clear the gears of the outer axles, carry bearings, 17$^b$, by which the gear frames are journaled on said axles. The universal joints by which the gear frames are suspended from the truck frames are each composed of a block or carrier, 18; a pin, 18$^a$, by which said block is pivoted, in the longitudinal central plane of the locomotive, to lugs, 21, projecting downwardly from the truck transom, 2$^g$; and a pin, 18$^b$, by which the gear frame is pivoted to the block, 18, at right angles to the pin, 18$^a$. It will be seen that by the above construction, the end sides of the journal boxes, and the relative frames without being transmitted to the sides of the journal boxes, and the relative vertical movements of the driven axles and pedestals, as well as the tipping of the axles in the truck frame, are permitted without impairing the normal relation of the driving and driven gears.

The universal joints or knuckles which couple the intermediate shafts, 1$^f$, to the gear shafts, 15, of the two trucks, each comprise a pin, 14, pressed into lugs on a coupling section, 14$^a$, fixed on the end of an intermediate shaft which adjoins a gear shaft, and a pin, 14$^b$, similarly secured, at right angles to the pin, 14, in a coupling section, 14$^c$, formed on or secured to the adjacent end portion of the gear shaft. The middle portions of the pins, 14 and 14$^b$, are milled out, as shown in Figs. 5 and 9, so as to permit their axes to be brought into substantially the same plane, and the pins are connected by, and fitted to turn freely in, a pair or rings, 14$^d$, which abut in a plane at right angles to the axis of the gear shaft and are secured together by bolts, 14$^e$, and nuts, 14$^f$. The bearings of the pins in the rings, 14$^d$, are fitted with bushings, 14$^g$, for the purpose of enabling wear to be taken up as may be required. Relative movement of the gear and intermediate shafts in both longitudinal and transverse planes, without interference with their normal rotative relation, is thus provided for. If preferred, the pins may be formed integral with the coupling sections, as trunnions projecting therefrom, and connected by the rings in the manner above described.

Various modifications of structural detail may be made within the discretion of those skilled in locomotive construction without departure from the spirit and operative principle of my invention, the leading and characteristic feature of which consists in the provision of a multiple cylinder motor of the single acting type, supported between a forward and a rear truck, on a frame which acts as a transverse brace to the main frame of the locomotive and imparting rotation, through central shafts and gearing, to one of the axles of each truck, the other axle of which is rotated by outside coupling rods.

I claim as my invention and desire to secure by Letters Patent;

1. The combination, in a locomotive, of a main frame, a boiler supported thereon, a front and a rear swiveling truck supporting the main frame, a motor comprising a plurality of oppositely located single acting steam cylinders, a cylinder frame interposed between and secured to the side members of the main frame and supporting said motor, a main or primary driving shaft extending longitudinally between the cylinders of the motor and rotated by connections to the pistons thereof, and gearing transmitting rotation from said main driving shaft to one of the axles of each truck.

2. The combination, in a locomotive, of a main frame comprising two side members and connecting front and rear buffer beams, a saddle interposed between and secured to the forward portions of the side members of the frame, a boiler supported at its front end on said saddle and at its rear end on the side members, a front swiveling truck connected to the forward portion of the main frame, a rear swiveling truck connected to the rear portion of the main frame, a cylinder frame interposed between and secured to the side members, and located between the front and rear trucks, a motor comprising a plurality of single acting steam cylinders secured to opposite sides of the cylinder frame, a longitudinally extending main or primary driving shaft journaled in bearings in the cylinder frame and rotated by connections to the pistons of the motor, and gearing transmitting rotation from said main driving shaft to one of the axles of each truck.

3. The combination, in a locomotive, of a main frame comprising two side frame members and connecting front and rear buffer beams, a boiler supported thereon, a front swiveling truck connected to the forward portion of the main frame, a rear swiveling truck connected to the rear portion of the main frame, a cylinder frame interposed between and secured to the side members and located between the front and rear trucks, tension rods passing through lugs on the cylinder frame and secured at their ends to the side members, a motor comprising a plurality of single acting steam cylinders secured to opposite sides of the cylinder frame, a longitudinally extending main or primary driving shaft journaled in bearings in the cylinder frame and rotated by connections to the pistons of the motor, and gearing transmitting rotation from said main driving shaft to one of the axles of each truck.

4. The combination, in a locomotive, of a main frame, a boiler supported thereon, a front and a rear swiveling truck supporting the main frame, a transverse cylinder frame interposed between and secured to the side members of the main frame and located between the front and rear trucks, said cylinder frame being in the form of an inclosed crank case, a motor comprising a plurality of single action steam cylinders secured to the sides of said cylinder frame, and gearing through which rotation is imparted from the motor shaft to one of the axles of each of the trucks.

5. The combination, in a locomotive, of a main frame, a boiler supported thereon, a front and a rear swiveling truck supporting the main frame, a transverse cylinder frame interposed between and secured to the side members of the main frame, and located between the front and rear trucks, a main or primary driving shaft journaled in bearings in the cylinder frame, a plurality of single acting steam cylinders secured to the sides of the cylinder frame and having their pistons coupled to crank pins on the driving shaft, and gearing through which rotation is imparted from the driving shaft to one of the axles of each of the trucks.

6. The combination, in a locomotive, of a main frame, a boiler supported thereon, a front and a rear swiveling truck supporting the main frame, a transverse cylinder frame interposed between and secured to the side members of the main frame and located between the front and rear trucks, a main or primary driving shaft journaled in bearings in the cylinder frame, two single acting steam cylinders secured to opposite sides of the cylinder frame and having their pistons coupled to a crank pin on the driving shaft, two connected distribution valves, each controlling the supply and exhaust of steam to and from one of said cylinders, a single valve actuating mechanism coupled to and simultaneously operating both of said distribution valves, and gearing through which rotation is imparted from the driving shaft to one of the axles of each of the trucks.

7. The combination, in a locomotive, of a main frame, a boiler supported thereon, a front and a rear swiveling truck supporting the main frame, a transverse cylinder frame interposed between and secured to the side members of the main frame, a main or primary driving shaft journaled in bearings in the cylinder frame, a crank wheel interposed between and secured to crank pins on crank arms set at right angles on the driving shaft, two pairs of oppositely set single acting steam cylinders secured to the sides of the cylinder frame, the members of each pair having their pistons coupled to one of the crank pins of the driving shaft, two valve actuating mechanisms, each operating the distribution valves of one of the pairs of cylinders, and gearing through which rotation is imparted from the driving shaft to one of the axles of each of the trucks.

8. The combination, in a locomotive, of a main frame, a boiler supported thereon, a swiveling truck supporting the main frame, a gear frame journaled at one end on one of the axles of the truck, a universal joint coupling the gear frame, adjacent to its opposite end, to the truck frame, a gear shaft journaled in the gear frame, a pinion fixed on the gear shaft, a gear fixed in the truck axle which carries the gear shaft and engaging said pinion, a motor mounted on the main frame, and connections through which rotation is imparted to the gear shaft from the driving shaft of the motor.

9. The combination, in a locomotive, of a main frame, a boiler supported thereon, a swiveling truck supporting the main frame, a gear fixed on one of the axles of said truck, a gear frame which is forked and of U form at one end to pass clear of said gear and is journaled in its forks on the axle thereof, a universal joint coupling the gear frame, adjacent to its opposite end, to the truck frame, a pinion fixed on the gear shaft and engaging the gear of the truck axle, a motor mounted on the main frame, and connections through which rotation is imparted to the gear shaft from the driving shaft of the motor.

10. The combination, in a locomotive, of a main frame, a boiler supported thereon, a swiveling truck supporting the main frame, a gear frame journaled at one end on one of the axles of the truck, a universal joint coupling the gear frame, adjacent to its opposite end, to the truck frame, a gear shaft journaled in the gear frame, a pinion fixed on the gear shaft, a gear fixed on the truck axle which carries the gear shaft and engaging said pinion, a motor mounted on the main frame, and a universal joint through which rotation is imparted to the gear shaft from the driving shaft of the motor.

11. The combination, in a truck for geared locomotives, of a gear frame journaled at one end on one of the axles of the truck, a universal joint coupling the gear frame, adjacent to its opposite end, to the truck frame, a gear shaft journaled in the gear frame, a pinion fixed on the gear shaft, a gear fixed on the truck axle which carries the gear shaft and engaging said pinion, a driving shaft section, a pin fixed on the gear shaft and having its middle portion milled or recessed out, a pin fixed on the driving shaft section at right angles to the pin of the gear shaft, and having its middle portion similarly formed, a pair of abutting rings embracing the ends of said pins, and connections securing said rings one to the other.

HAL R. STAFFORD.

Witnesses:
J. G. BLUNT,
J. S. PFEIFFER.